UNITED STATES PATENT OFFICE.

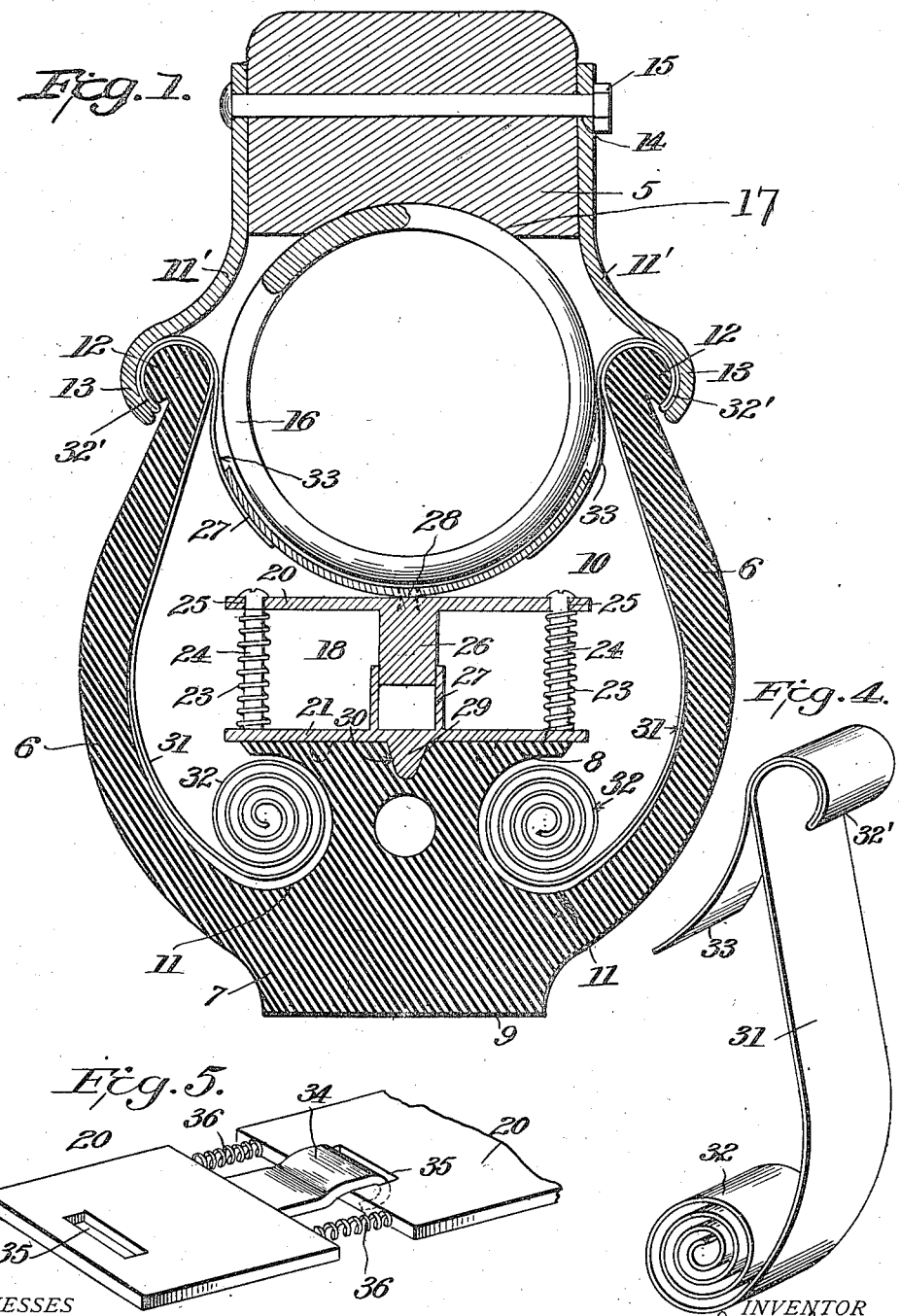

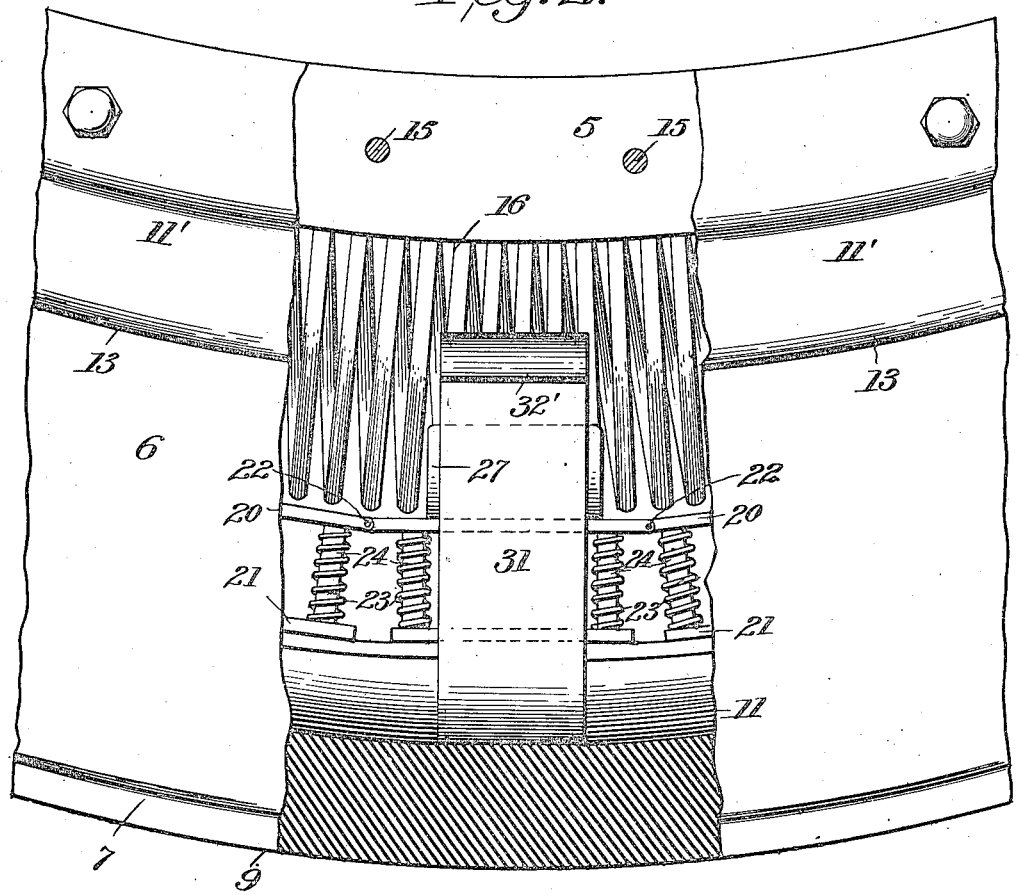
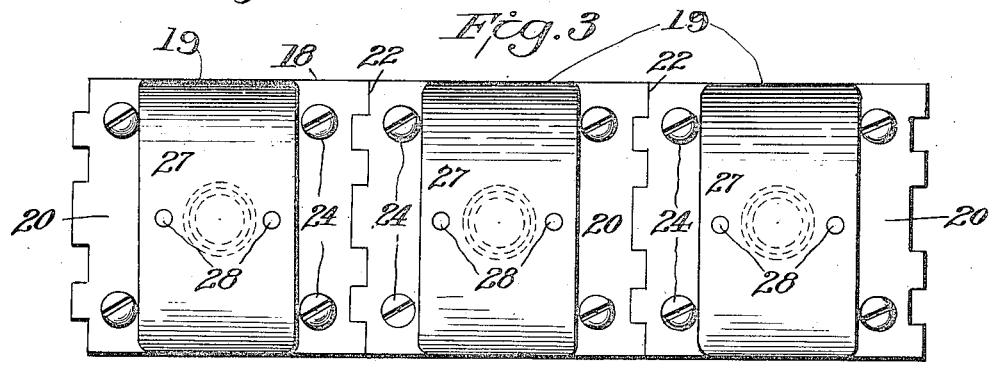

WILLIAM FRANCIS GAUL, OF JERSEY CITY, NEW JERSEY, ASSIGNOR OF ONE-HALF TO E. H. FAHEY, OF PHILADELPHIA, PENNSYLVANIA.

TIRE.

1,042,426.

Specification of Letters Patent.

Patented Oct. 29, 1912.

Application filed July 31, 1911. Serial No. 641,670.

*To all whom it may concern:*

Be it known that I, WILLIAM F. GAUL, a citizen of the United States of America, residing at Jersey City, in the county of Hudson and State of New Jersey, have invented certain new and useful Improvements in Tires, of which the following is a specification.

This invention relates to cushion tires for vehicle wheels and has for its object to provide a substitute for the ordinary pneumatic rubber tire.

A further object is to provide a non-collapsible tire, which while possessing the resilient qualities of rubber will have a greater length of life and consequently be less expensive to use than the so called inner tube tire.

With these and other objects in view the invention comprises the novel features of construction and combination of parts more fully hereinafter described.

In the accompanying drawings, Figure 1 is a cross sectional view. Fig. 2 is a side view of the tire partially in section. Fig. 3 is a detail view of the cushion member 18. Fig. 4 is a perspective view of one of the springs 31. Fig. 5 is a detail view of a modified construction of plates 20.

Referring more specifically to the drawings in which like numerals designate corresponding parts throughout the several views, 5 is a wheel felly having a flat periphery and is or may be otherwise of any suitable construction and material. The rubber portion of the tire is preferably an unbroken circle comprising outwardly bulged side walls 6, and thickened tread portion having flat inner and outer faces 8 and 9 respectively. The tread portion is preferably bored centrally as at 10 and has annular half round grooves or cut-out portions 11 for a purpose hereinafter described.

Side plates 11' preferably of spring steel have one edge thereof curved or hook-shaped as at 13 to engage the flanges 12 on the side walls 6 and the opposite edge of these plates is provided with perforations 14 for the reception of bolts 15, which latter secure the plates to the felly.

A tightly compressed endless spiral spring 16 is seated within the recessed face 17 of the felly and interposed between the latter and a cushion member 18. This cushion member comprises a plurality of radially extending sections 19, each of which consists of a top and bottom metallic plate 20 and 21 respectively. The top plate 20 of each section 19 is hingedly connected to the top plate of the next adjacent section as at 22 and the top and bottom plates of each section are resiliently held in spaced relation to each other by means of compression springs 23 on headed posts 24 carried by the bottom plates.

As clearly illustrated in Fig. 1 the posts 24 project upwardly from the bottom plates and work loosely through openings 25 in the top plates. These posts 24 are suitably secured to the bottom plates 21 by welding or, preferably by an ordinary screw threaded connection. An additional cushion support for the top plates may also be provided such as the stud 26 and cylindrical cup 27 carried by the top and bottom plates respectively.

Each top plate 21 carries a concave segment 27 secured thereto by riveting or in any suitable manner, as 28. These segments afford a seat for the spiral spring 16, before mentioned and effectively secure the same against lateral displacement. The bottom plates of each section rest upon the inner flat face 8 of the tread portion 7 of the tire and are preferably secured thereto by means of interengaging lugs and recesses 29 and 30.

A plurality of flat steel springs 31 which have their lower ends coiled as at 32 to snugly fit within the peripheral grooves 11 extend upwardly and outwardly conforming to the curvature of the side walls 6 of the tire and terminate at their ends in hook portions 32', which engage the flanges 12 (see Fig. 1). An inwardly and downwardly curved extension or arm 33 is formed by doubling the spring 32 back upon itself after forming the hook portions 32'. These extensions are adapted to engage beneath the segments 27 with their lower end portion and to bear against and support the spiral spring 16 with their upper end portions.

In Fig. 5 I have illustrated a modified form of cushion device 18, wherein the top plates are formed with curved tongues 34 and slots 35. The sections are thus capable of some little play about the periphery of the spiral spring 16. Coil springs 36 also resiliently connect the top plates of each section together and serve to return the parts to normal position in case of displacement through jarring or other causes.

From the foregoing it will be seen that a direct downward pressure of the vehicle will be distributed through the endless coiled spring 16 to the sections 19 and thence to the upwardly extending portions of the flat springs 31. The tread portion 7 will also be slightly collapsed under an extraordinary pressure or load, whereupon the coiled portion 32 of the springs 31 will assist in sustaining the load. However, the principal function of the peculiarly shaped springs 31 is to receive and absorb the lateral strain incident to rounding curves, etc.

As many changes could be made in the above construction and many apparently different embodiments of my invention could be made without departing from the spirit or scope thereof, it is intended that all matter contained in this specification and drawings shall be interpreted as illustrative and not in a limiting sense.

Having thus described my invention, what I claim is:

1. A cushion tire for wheels comprising a rim, a continuous spiral spring around the periphery of said rim, a rubber tread portion having annular grooves therein, a plurality of flat springs having a coil at one end seated in said annular grooves and a curved arm at the other end engaging said spiral spring, and resilient supporting means interposed between said tread portion and said spiral spring.

2. A cushion tire for wheels comprising a rim, a continuous spiral spring around the periphery of said rim, a tread portion having annular grooves therein, curved side walls extending upwardly from said tread portion provided with flanges, spaced leaf springs having a coiled inner end adapted to seat in said annular grooves and a hook-shaped outer end adapted to engage said flanges, said springs being doubled back upon themselves to form an arm for supporting said spiral spring, and means for securing said rim to said tread portion.

3. A cushion tire for wheels comprising a rim, means for supporting said rim including a continuous spiral spring, a plurality of hinged sections extending around the outer periphery of said spiral spring, said sections comprising a bottom plate having posts thereon, a top plate slidably mounted on said posts, resilient means for normally forcing said plates apart, concave segments secured to said top plate, a tread portion having annular grooves and flanged side walls, leaf springs seated in said grooves at one end and having the other end thereof hook-shaped to conform to the contour of said flanges, and said hook-shaped end being provided with an extension adapted to engage beneath said segments and said spiral spring.

4. A cushion tire for wheels comprising a rim, a resilient supporting member around the periphery of said rim, a tread portion having grooves, a plurality of hinged sections around the inner periphery of said tread portion and interposed between said rim supporting member and said tread, said sections comprising top and bottom plates, resilient means normally holding said plates in spaced relation, resilient means having one end seated in the grooves in said tread and a curved extension at the other end adapted to bear against and support said resilient supporting member.

In testimony whereof I affix my signature in presence of two witnesses.

WILLIAM FRANCIS GAUL.

Witnesses:
HOWARD L. JONES,
E. H. FAHEY.